United States Patent Office — 2,748,122 — Patented May 29, 1956

2,748,122
2-ANILINO-4,6-DIMETHYLPYRIMIDINES

Robert R. Burtner, Skokie, Ill., assignor, by mesne assignments, to G. D. Searle & Co., Skokie, Ill., a corporation of Delaware No Drawing. Application May 6, 1954,
Serial No. 428,139

2 Claims. (Cl. 260—256.4)

This invention relates to derivatives of 2-anilino-4,6-dimethylpyrimidine, to acid addition and quaternary ammonium salts thereof, and to processes for the manufacture of these pyrimidine derivatives and their salts. More particularly, this invention relates to compounds of the formula

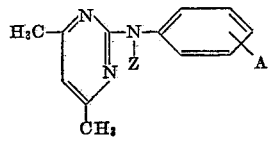

wherein A is hydrogen or a lower alkoxyl radical containing not more than 5 carbon atoms and Z is a monovalent aliphatic organic radical defined by one of the following formulas:

—$CONHC_2H_5$ (ethylcarbamyl),
—$CONHCH_2CH_2N(C_2H_5)_2$ ($\beta$ - diethylaminoethylcarbamyl), and
—$COOCH_2CH_2N(C_2H_5)_2$ ($\beta$ - diethylaminoethoxyformyl).

The lower alkoxyl radicals comprehended by A as hereinabove defined may be in positions ortho, meta, or para to the point of attachment of the anilino nitrogen, and include such radicals as methoxy, ethoxy, propoxy, isopropoxy, butoxy, isobutoxy, secondary butoxy, tertiary butoxy, amoxy, secondary normal amoxy, primary isoamoxy, secondary isoamoxy, tertiary amoxy and like —$OC_nH_{2n+1}$ radicals wherein $n$ is a positive integer amounting to less than 6.

Equivalent to the compounds of the foregoing general formula for the purposes of this invention are the acid addition and quaternary ammonium salts formed by interaction of the subject compounds with 1 or 2 equivalents of any of various inorganic or strong organic acids, or a lower alkyl ester or halide, respectively. These acid addition and quaternary ammonium salts may be represented by the formula

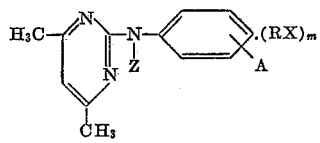

wherein A and Z have the meanings hereinbefore assigned, R is hydrogen or a lower alkyl radical containing not more than 5 carbon atoms, X is one equivalent of a non-toxic anion, and $m$ is a positive integer not greater than 2. Among the lower alkyl radicals comprehended by R in the above salt formula are methyl, ethyl, propyl, isopropyl, butyl, isobutyl, secondary butyl, tertiary butyl, amyl, secondary normal amyl, primary isoamyl, secondary isoamyl, tertiary amyl, and other such —$C_sH_{2s+1}$ radicals wherein $s$ is a positive integer amounting to less than 6. The non-toxic anions represented by X are those anions, each of which, in combination with the cationic portion of a salt aforesaid, are neither pharmacologically nor otherwise undesirable in pharmaceutical dosage. Examples are chloride, bromide, iodide, methyl sulfate, ethyl sulfate, benzenesulfonate, toluenesulfonate, tartrate, succinate, malate, acetate, citrate, nitrate, sulfate, phosphate, sulfamate, and like non-toxic anions.

The compounds of this invention are useful in medicine for the treatment of disease and the relief of conditions inimical to the well-being of the animal body. For example, the claimed compounds are diuretics. They have the property of augmenting both urine volume and sodium excretion, producing a significant loss of body weight and decreased dyspnea in cases of edema associated with congestive cardiac failure, renal disease, cirrhosis of the liver, and other common pathologic states. Moreover, the compounds of this invention show appreciable chemo-therapeutic promise in the field of cardiac pathology. In particular, they are valuable because of their digitalis-like activity, showing marked capacity for myocardial stimulation in instances of insufficiency associated with the failing heart.

The amine bases which comprise this invention are relatively insoluble in water, but may be dissolved in dilute acids and in most of the common organic solvents. The acid addition and quaternary ammonium salts of this invention are, on the other hand, readily soluble in water and in aqueous solutions of alcohols or other water-miscible organic solvents. The subject compounds may be administered in solid form as tablets or capsules; dissolved in aqueous media, they may be given parenterally.

The compounds to which this invention relates are derived from 2-anilino-4,6-dimethylpyrimidine and the appropriate lower alkyl ethers thereof. Using the procedure of Curd and Rose, J. Chem. Soc., 1946, 343, a 2-halo-4,6-dimethylpyrimidine—for example, 2-chloro-4,6-dimethylpyrimidine—is heated with aniline—or one of its lower alkyl ethers such as anisidine and phenetidine—to produce the aforesaid starting materials. They, in turn, are converted to the claimed compounds by (1) interaction at between 85° and 140° centigrade during 6 to 18 hours with ethyl isocyanate, using a non-polar inert organic solvent—desirably benzene—as the reaction medium; or (2) seriatim reaction with phosgene and either $\beta$-diethylaminoethylamine or $\beta$-diethylaminoethanol, the first reaction being carried out at temperatures ranging between −10° and 35° centigrade (initial reaction being at 0° ± 10° for 2–5 hours, subsequent reaction being at room temperatures or slightly above for as long as 12 hours) in chloroform—or other preferably chlorinated hydrocarbon solvent—under the influence of a basic condensing agent such as tri-n-butylamine or the equivalent, and the alternative second reactions being effected at 65° to 110° centigrade over ½ to 3 hours time in an inert non-polar solvent such as benzene. Conversion of the amine bases to the corresponding acid addition salts is accomplished by simple admixture of the said compounds with selected inorganic and strong organic acids. Alternatively, the bases in question may be quaternized by addition of an alkyl ester of the formula

R—X

R and X having the meanings hereinbefore assigned. Quaternization takes place in the temperature range between 25° and 100° centigrade, using inert solvents such as chloroform, acetone, methyl ethyl ketone, methanol, butanol, and the like as reaction media. Quaternization is ordinarily completed in from 12 to 48 hours and is generally carried out in a closed system if a lower alkyl halide—such as methyl chloride—is one of the reagents. Using methyl chloride, the reaction may be smoothly effected in chloroform solution at 80° centigrade, the reaction time being 24 hours.

The following examples will illustrate in detail certain of the compounds which constitute the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.), pressures in millimeters (mm.) of mercury, and relative amounts of materials in parts by weight, except as otherwise noted.

*Example 1*

A. *2-[N-(β-diethylaminoethyl)-anilino] - 4,6-dimethylpyrimidine.*—A stirred suspension of 193 parts of 4,6-dimethyl-2-anilinopyrimidine—obtained by the method of Curd and Rose, loc. cit.—and 39 parts of sodamide in 2600 parts of dry toluene is heated at reflux temperatures in an atmosphere of nitrogen until evolution of ammonia substantially ceases. (Approximately 3½ hours is required.) Heating is thereupon discontinued while 135 parts of β-diethylaminoethyl chloride is added. Refluxing is then resumed for 20 hours, following which the reaction mixture is diluted with water. The toluene layer is separated and distilled, yielding a yellow oil, the boiling point of which is 148–135° C. at 0.4 mm. pressure. This material is 2-[N-(β-diethylaminoethyl)-anilino]-4,6-dimethylpyrimidine. It has the formula

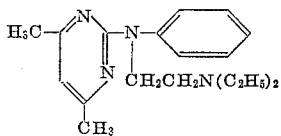

B. *2 - [N-(β-diethylaminoethyl) - anilino]-4,6-dimethylpyrimidine dihydrochloride.*—A solution of 149 parts of the base of the preceding Part A in approximately 160 parts of propanol-2 is treated with two equivalents of absolute alcoholic hydrogen chloride. Approximately 1800 parts of anhydrous ether is then introduced. The viscous dihydrochloride first formed crystallizes on standing. The product is twice crystallized from 1200-part quantities of butanone, using decolorizing charcoal in process. The product—obtained as pale yellow crystals—is too hygroscopic to melt definitively.

C. *2 - [N-(β-diethylaminoethyl)-anilino] - 4,6-dimethylpyrimidine methiodide.*—Interaction of 84 parts of the base of the preceding Part A and 40 parts of methyl iodide in approximately 1100 parts of chloroform at room temperatures for 24 hours, followed by removal of solvent and subsequent dilution with anhydrous ether, affords the desired quaternary salt which, crystallized from a mixture of 275 parts of propanol-2 and 630 parts of ethyl acetate—using decolorizing charcoal in process—shows M. P. approximately 157° C. (with decomposition). The bright yellow crystals thus obtained are moderately soluble in water.

*Example 2*

A. *4,6-dimethyl-2-p - phenetidinopyrimidine.*—A mixture of 142 parts of 4,6-dimethyl-2-chloropyrimidine and 274 parts of p-phenetidine is heated at 85–100° C. for 3 hours. The reaction product is dissolved in a hot mixture of 240 parts of muriatic acid and 1300 parts of water. The resulting solution, after cooling, is made alkaline by addition of an excess of 50% aqueous caustic soda. The oily product thus precipitated is taken up in ether. The ether solution is washed with water and then dried over anhydrous potassium carbonate. Solvent and excess p-phenetidine are removed by distillation. The residue solidifies on cooling, and is thereupon recrystallized from approximately 1000 parts of normal heptane to give nearly colorless needles, M. P. 96–97° C. The hydrochloride is obtained as bright yellow crystals, M. P. 191–192° C. It dissociates in water solution but redissolves upon addition of dilute muriatic acid.

B. *2-[N-(β-diethylaminoethyl) - p - phenetidino] - 4,6 - dimethylpyrimidine.*—Interaction of 194 parts of the 4,6-dimethyl-2-p-phenetidionopyrimidine of Part A of this example, 31 parts of sodamide, and 108 parts of β-diethylaminoethyl chloride, according to the technique of Example 1A using toluene as the solvent, affords 2-[N-(β-diethylaminoethyl)-p-phenetidino] - 4,6-dimethylpyrimidine as a yellow oil, B. P. 175–180° C. at 0.3 mm. pressure. The product, 2-[N-(β-diethylaminoethyl)-p-phenetidine]-4,6-dimethylpyrimidine, has the formula

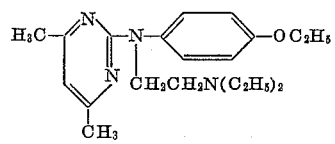

C. *2-[N-(β-diethylaminoethyl)-p-phenetidino] - 4,6-dimethylpyrimidine hydrochloride.*—A solution of 171 parts of the base of the preceding Part B in 160 parts of propanol-2 is treated with one equivalent of an absolute alcohol solution of hydrogen chloride and then diluted with approximately 1400 parts of ether. The viscous acid addition salt first formed slowly crystallizes, whereupon it is collected, rinsed with ether, and recrystallized (with the use of decolorizing charcoal) from approximately 10 volumes of ethyl acetate, in that order. Bright yellow crystals, M. P. 180–189° C., result. Recrystallization from 20 volumes of butanone yields golden needles, M. P. approximately 190° C. The product is readily soluble in water.

D. *2-[N-(β-diethylaminoethyl) - p - phenetidino]-4,6-dimethylpyrimidine methiodide.*—A solution of 52 parts of the base of the preceding Part B and approximately 22 parts of methyl iodide in approximately 750 parts of chloroform is maintained in a sealed vessel for 24 hours at room temperatures. Solvent is removed by vacuum distillation, and the viscous residue is then suspended in approximately 1400 parts of anhydrous ether. The desired quaternary salt crystallizes on standing. It is—successively—collected, rinsed with a little fresh ether, and crystallized from a mixture of approximately 140 parts of propanol-2 and 325 parts of ethyl acetate, using decolorizing charcoal in this last operation. The colorless 2-[N-(β-diethylaminoethyl)-p-phenetidino] - 4,6 - dimethylpyrimidine methiodide thus obtained shows M. P. 161–162° C. (with decomposition). The product is soluble in water.

*Example 3*

*4,6-dimethyl-2-[N-(ethylcarbamoyl) - p - phenetidino]-pyrimidine.*—A solution of approximately 122 parts of 4,6-dimethyl - 2 - p - phenetidinopyrimidine—prepared according to Example 2A above—and 36 parts of ethyl isocyanate in approximately 350 parts of anhydrous benzene is heated at reflux temperatures for 12 hours. Solvent is stripped by vacuum distillation, following which the crude residue is crystallized from a mixture of 485 parts of benzene and 700 parts of cyclohexane to yield lustrous white platelets of 4,6-dimethyl-2-[N-(ethylcarbamoyl)-p-phenetidino]-pyrimidine, M. P. approximately 162° C. (with decomposition). The product has the formula

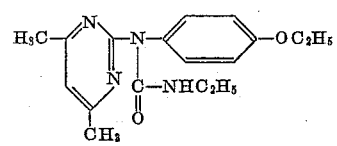

Example 4

A. *N - (4,6 - dimethyl-2-pyrimidino)-N-p-ethoxyphenylcarbamoyl chloride.*—A solution of 275 parts of 4,6-dimethyl-2-p-phenetidinopyrimidine—prepared by the method of Example 2A—and 209 parts of tri-n-butylamine in approximately 1100 parts of chloroform is added dropwise at −5° to 0° C., with agitation, to a solution of 112 parts of phosgene in 750 parts of chloroform. There is a marked exothermic effect, and the mixture becomes dark brown in color. Agitation is continuous for 5 hours at 0° C., and then for 12 hours at room temperatures. Solvent is stripped by vacuum distillation at less than 40° C., following which the dark viscous residue is taken up in approximately 3500 parts of anhydrous ether. This solution is washed once with ice water and then immediately dried over anhydrous sodium sulfate. Solvent is again stripped in vacuo, following which the dark brown viscous residue crystallizes on standing. Recrystallization from a large volume of substantially normal heptane solvent affords yellow plates of the desired product, M. P. 105–106° C. Treatment of this carbamoyl chloride with 33% ethylamine affords an alternate route to the 4,6-dimethyl-2-[N-(ethylcarbamoyl)-p-phenetidino]-pyrimidine of Example 3 above.

B. *2 - [N - (β - diethylaminoethylcarbamoyl)-p-phenetidino]-4,6-dimethylpyrimidine.*—To a solution of 160 parts of the carbamoyl chloride of the preceding part A in 1540 parts of dry benzene is added 174 parts of β-diethylaminoethylamine. An exothermic effect is noted in process. The reactants are heated at reflux temperatures for 1½ hours, following which they are cooled and then washed with 2000 parts of 5% aqueous caustic soda. The benzene solution is next washed with water, following which solvent is stripped by vacuum distillation. The solid residue is recrystallized twice from 6 and 20 volumes, respectively, of cyclohexane, using decolorizing charcoal in process. The tiny, pale yellow needles of 2-[N-(β-diethylaminoethylcarbamoyl)-p-phenetidino] - 4,6-dimethylpyrimidine thus obtained show M. P. 143° C. The product is soluble in dilute muriatic acid. It has the formula

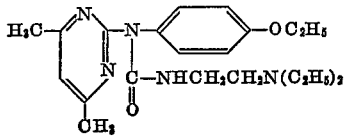

Example 5

*2-[N-(β-diethylaminoethoxyformyl) - p - phenetidino]-4,6-dimethylpyrimidine.*—A mixture of 160 parts of the carbamoyl chloride of Example 4A and 129 parts of β-diethylaminoethanol in 1540 parts of dry benzene is heated at reflux temperatures for 2 hours. The reaction mixture is cooled and then washed by agitation with 1000 parts of 5% aqueous caustic soda. The benzene layer is separated, washed with water, and stripped of solvent and excess amino alcohol by distillation at 0.3 mm. pressure, in that order. The crude residue is purified by routine conversion to the oxalate in ether solution, the salt being crystallized from approximately 1600 parts of butanone. The oxalate is obtained as a sand-colored material, M. P. 104–105° C. It is taken up in approximately 4000 parts of water, and traces of insoluble material are thereupon removed by filtration. The filtrate, made alkaline with 10% aqueous caustic soda, throws down the oily base which crystallizes on chilling. The 2-[N-(β-diethylaminoethoxyformyl)-p-phenetidino] - 4,6-dimethylpyrimidine thus purified is twice recrystallized from 10 volumes of normal heptane—using decolorizing charcoal in process—to give lustrous white plates, M. P. approximately 74° C. The material is soluble in dilute muriatic acid and has the formula

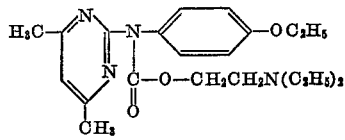

I claim:
1. A compound of the formula

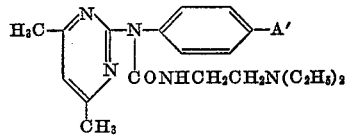

wherein A' is a lower alkoxyl radical containing less than 6 carbon atoms.

2. 2-[N-(β-diethylaminoethylcarbamoyl) - p - phenetidino]-4,6-dimethylpyrimidine.

References Cited in the file of this patent

Idson: Chem. Reviews 47, 482 (1950).